United States Patent
Rasch et al.

(10) Patent No.: US 11,556,770 B2
(45) Date of Patent: Jan. 17, 2023

(54) AUTO WEIGHT SCALING FOR RPUS

(71) Applicant: International Business Machines Corporation, Armonk, NY (US)

(72) Inventors: Malte Rasch, Chappaqua, NY (US); Tayfun Gokmen, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 16/427,598

(22) Filed: May 31, 2019

(65) Prior Publication Data

US 2020/0380349 A1 Dec. 3, 2020

(51) Int. Cl.
| | |
|---|---|
| G06N 3/063 | (2006.01) |
| G06N 3/08 | (2006.01) |
| G06F 7/52 | (2006.01) |
| G06F 7/02 | (2006.01) |
| G06N 3/04 | (2006.01) |

(52) U.S. Cl.
CPC .......... *G06N 3/0635* (2013.01); *G06F 7/023* (2013.01); *G06F 7/52* (2013.01); *G06N 3/04* (2013.01); *G06N 3/08* (2013.01)

(58) Field of Classification Search
CPC .......... G06N 3/0635; G06N 3/04; G06N 3/08; G06F 7/023; G06F 7/52
See application file for complete search history.

(56) References Cited

U.S. PATENT DOCUMENTS

| | | | |
|---|---|---|---|
| 8,655,813 | B2 | 2/2014 | Ananthanarayanan et al. |
| 8,712,940 | B2 | 4/2014 | Modha |
| 8,924,322 | B2 | 12/2014 | Datta et al. |
| 9,646,243 | B1 | 5/2017 | Gokmen |
| 9,767,407 | B2 | 9/2017 | Cho et al. |
| 9,852,790 | B1 | 12/2017 | Gokmen et al. |
| 2016/0307098 | A1 | 10/2016 | Goel et al. |
| 2017/0061281 | A1* | 3/2017 | Gokmen ............... G06N 3/084 |

(Continued)

OTHER PUBLICATIONS

Alex Krizhevsky et al., "ImageNet Classification with Deep Convolutional Neural Networks," Advances in Neural Information Processing Systems, Jan. 2012, pp. 1097-1105.

(Continued)

*Primary Examiner* — Ying Yu Chen
(74) *Attorney, Agent, or Firm* — James Olsen; Michael J. Chang, LLC

(57) ABSTRACT

Techniques for auto weight scaling a bounded weight range of RPU devices with the size of the array during ANN training are provided. In one aspect, a method of ANN training includes: initializing weight values $w_{init}$ in the array to a random value, wherein the array represents a weight matrix W with m rows and n columns; calculating a scaling factor β based on a size of the weight matrix W; providing digital inputs x to the array; dividing the digital inputs x by a noise and bound management factor α to obtain adjusted digital inputs x'; performing a matrix-vector multiplication of the adjusted digital inputs x' with the array to obtain digital outputs y'; multiplying the digital outputs y' by the noise and bound management factor α; and multiplying the digital outputs y' by the scaling factor β to provide digital outputs y of the array.

23 Claims, 5 Drawing Sheets

(56) References Cited

U.S. PATENT DOCUMENTS

2017/0109628 A1 4/2017 Gokmen et al.
2017/0154259 A1 6/2017 Burr et al.
2018/0293209 A1 10/2018 Gokmen et al.
2019/0138882 A1* 5/2019 Choi .................... G06N 3/0481

OTHER PUBLICATIONS

Kim et al., "Analog CMOS-based Resistive Processing Unit for Deep Neural Network Training," 2017 IEEE 60th International Midwest Symposium on Circuits and Systems (MWACAS), (Aug. 2017) (4 pages).

Rumelhart et al., "Learning representations by back-propagating errors," Nature 323, pp. 533-536 (Oct. 1986).

Gokmen et al., "Training Deep Convolutional Neural Networks with Resistive Cross-point Devices," Frontiers in Neuroscience, vol. 11, article 538 (Oct. 2017) (13 pages).

LeCun et al., "Deep Learning," Nature 521, pp. 436-444 (May 2015).

Wilfried Haensch et al., "The Next Generation of Deep Learning Hardware: Analog Computing," Proceedings of the IEEE, vol. 107, No. 1, Jan. 2019, pp. 108-122.

\* cited by examiner

AUTO WEIGHT SCALING FOR RPUS

FIELD OF THE INVENTION

The present invention relates to training of artificial neural networks (ANNs) having analog cross-point arrays of resistive processing unit (RPU) devices, and more particularly, to techniques for auto weight scaling a bounded weight range of the RPU devices with the size of the array during ANN training.

BACKGROUND OF THE INVENTION

An artificial neural network (ANN) can be embodied in an analog cross-point array of resistive devices such as the resistive processing units (RPUs) described in U.S. Patent Application Publication Number 2017/0109628 by Gokmen et al., entitled "Resistive Processing Unit" (hereinafter "U.S. Patent Application Publication Number 2017/0109628"), the contents of which are incorporated by reference as if fully set forth herein. As described in U.S. Patent Application Publication Number 2017/0109628, each RPU includes a first terminal, a second terminal and an active region. A conductance state of the active region identifies a weight value of the RPU, which can be updated/adjusted by application of a signal to the first/second terminals.

ANN-based models have been used for a variety of different cognitive based tasks such as object and speech recognition and natural language processing. See, for example, Gokmen et al., "Training Deep Convolutional Neural Networks with Resistive Cross-point Devices," Frontiers in Neuroscience, vol. 11, article 538 (October 2017) (13 pages), the contents of which are incorporated by reference as if fully set forth herein. Neural network training is needed to provide a high level of accuracy when performing such tasks.

However, the weight range (resistance values) of the RPU devices are limited in a bounded range with limited and finite state resolution which limits the weight range that can be used for ANN training.

Thus, techniques for optimizing the available resistive state resources of the RPU devices for ANN training would be desirable.

SUMMARY OF THE INVENTION

The present invention provides techniques for auto weight scaling a bounded weight range of the resistive processing unit (RPU) devices with the size of the array during artificial neural networks (ANN) training. In one aspect of the invention, a method of ANN training is provided. The method includes: initializing weight values $w_{init}$ in an array of RPU devices to a random value, wherein the array of RPU devices represents a weight matrix W with m rows and n columns by storing weight values w of the weight matrix W as resistive values of the RPU devices in the array; calculating a scaling factor $\beta$ based on a size of the weight matrix W; providing digital inputs x to the array; dividing the digital inputs x by a noise and bound management factor $\alpha$ to obtain adjusted digital inputs x'; performing a matrix-vector multiplication of the adjusted digital inputs x' with the array to obtain digital outputs y'; multiplying the digital outputs y' by the noise and bound management factor $\alpha$; and multiplying the digital outputs y' by the scaling factor $\beta$ to provide digital outputs y of the array.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for improving the training of artificial neural networks (ANNs) with analog resistive processing unit (RPU) devices where the weight range (resistance values) are limited in a bounded range with limited and finite state resolution (precision). Namely, as will be described in detail below, the present techniques optimally map the available resistive state resources (i.e., of the RPU devices) in a weight range that is useful for the ANN training by scaling the bounded weight range of RPU devices (referred to herein as "auto weight scaling") with the size of the array.

Figure 1:
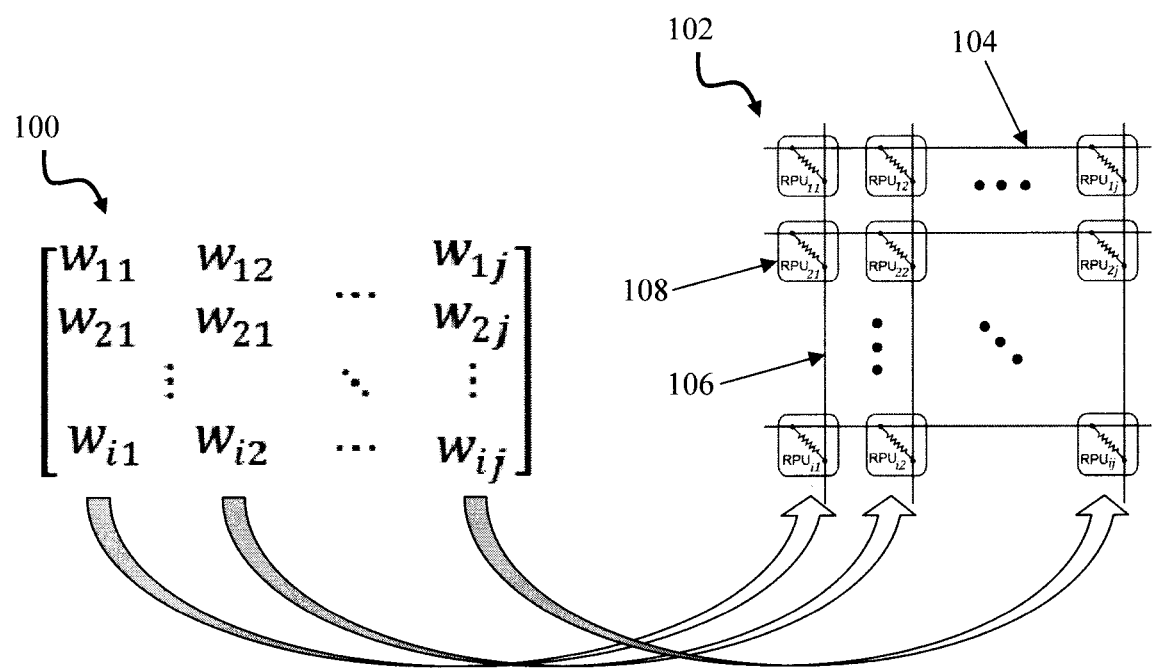
FIG. 1 is a diagram illustrating an artificial neural network (ANN) embodied in an analog cross-point array of resistive processing unit (RPU) devices according to an embodiment of the present invention.

As provided above, an ANN can be embodied in an analog cross-point array of RPU devices. See, for example, FIG. 1. As shown in FIG. 1, each parameter (weight $w_{ij}$) of algorithmic (abstract) weight matrix 100 is mapped to a single RPU device ($RPU_{ij}$) on hardware, namely a physical cross-point array 102 of RPU devices. The cross-point array 102 has a series of conductive row wires 104 and a series of conductive column wires 106 oriented orthogonal to, and intersecting, the conductive row wires 104. The intersections of the conductive row wires 104 and column wires 106 are separated by RPU devices 108 forming cross-point array 102 of RPU devices 108. As described in U.S. Patent Application Publication Number 2017/0109628, each RPU device 108 can include a first terminal, a second terminal and an active region. A conduction state of the active region identifies a weight value of the RPU device 108, which can be updated/adjusted by application of a signal to the first/second terminals. Further, three-terminal (or even more terminal) devices can serve effectively as two-terminal resistive memory devices by controlling the extra terminals. For a description of three-terminal RPU devices see, for example, Kim et al., "Analog CMOS-based Resistive Processing Unit for Deep Neural Network Training," 2017 IEEE 60th International Midwest Symposium on Circuits and Systems (MWACAS), (August 2017) (4 pages), the contents of which are incorporated by reference as if fully set forth herein.

Each RPU device 108 (RPU$_{ij}$) is uniquely identified based on its location in (i.e., the i$^{th}$ row and j$^{th}$ column) of the cross-point array 102. For instance, going from the top to bottom, and from the left to right of cross-point array 102, the RPU device 108 at the intersection of the first conductive row wire 104 and the first conductive column wire 106 is designated as RPU$_{i1}$, the RPU device 108 at the intersection of the first conductive row wire 104 and the second conductive column wire 106 is designated as RPU$_{i2}$, and so on. The mapping of the weight parameters in weight matrix 100 to the RPU devices 108 in cross-point array 102 follows the same convention. For instance, weight w$_{i1}$ of weight matrix 100 is mapped to RPU$_{i1}$ of the cross-point array 102, weight w$_{i2}$ of weight matrix 100 is mapped to RPU$_{i2}$ of the cross-point array 102, and so on.

The RPU devices 108 of the cross-point array 102 function as the weighted connections between neurons in the ANN. The resistance of the RPU devices 108 can be altered by controlling the voltages applied between the individual conductive row and column wires 104 and 106. Altering the resistance is how data is stored in the RPU devices 108 based, for example, on a high resistance state or a low resistance state. The resistance state of the RPU devices 108 is read by applying a voltage and measuring the current that passes through the target RPU device 108. All of the operations involving weights are performed fully in parallel by the RPU devices 108.

In machine learning and cognitive science, ANN-based models are a family of statistical learning models inspired by the biological neural networks of animals, and in particular the brain. These models may be used to estimate or approximate systems and cognitive functions that depend on a large number of inputs and weights of the connections which are generally unknown. ANNs are often embodied as so-called "neuromorphic" systems of interconnected processor elements that act as simulated "neurons" that exchange "messages" between each other in the form of electronic signals. The connections in ANNs that carry electronic messages between simulated neurons are provided with numeric weights that correspond to the strength or weakness of a given connection. These numeric weights can be adjusted and tuned based on experience, making ANNs adaptive to inputs and capable of learning. For example, an ANN for handwriting recognition is defined by a set of input neurons which may be activated by the pixels of an input image. After being weighted and transformed by a function determined by the network's designer, the activations of these input neurons are then passed to other downstream neurons. This process is repeated until an output neuron is activated. The activated output neuron determines which character was read.

As will be described in further detail below, an ANN can be trained with an incremental or stochastic gradient descent (SGD) process, in which the error gradient of each parameter (weight w$_{ij}$) is calculated using backpropagation. See, for example, Rumelhart et al., "Learning representations by back-propagating errors," Nature 323, pp. 533-536 (October 1986), the contents of which are incorporated by reference as if fully set forth herein. Backpropagation is performed in three cycles, a forward cycle, a backward cycle, and a weight update cycle which are repeated multiple times until a convergence criterion is met.

DNN based models are composed of multiple processing layers that learn representations of data with multiple levels of abstraction. See, for example, LeCun et al., "Deep Learning, Nature 521, pp. 436-444 (May 2015), the contents of which are incorporated by reference as if fully set forth herein. For a single processing layer where N input neurons are connected to M output neurons, the forward cycle involves computing a vector-matrix multiplication (y=Wx) where the vector x of length N represents the activities of the input neurons, and the matrix W of size M×N stores the weight values between each pair of the input and output neurons. The resulting vector y of length M is further processed by performing a non-linear activation on each of the resistive memory elements and then passed to the next layer.

Once the information reaches to the final output layer, the backward cycle involves calculating the error signal and backpropagating the error signal through the ANN. The backward cycle on a single layer also involves a vector-matrix multiplication on the transpose (interchanging each row and corresponding column) of the weight matrix (z=W$^T$δ), where the vector δ of length M represents the error calculated by the output neurons and the vector z of length N is further processed using the derivative of neuron non-linearity and then passed down to the previous layers.

Lastly, in the weight update cycle, the weight matrix W is updated by performing an outer product of the two vectors that are used in the forward and the backward cycles. This outer product of the two vectors is often expressed as W←W+η(δx$^T$), where η is a global learning rate.

All of the operations performed on the weight matrix W during this backpropagation process can be implemented with the cross-point array 102 of RPU devices 108 having a corresponding number of m rows and n columns, where the stored conductance values in the cross-point array 102 form the matrix W. In the forward cycle, input vector x is transmitted as voltage pulses through each of the conductive column wires 106, and the resulting vector y is read as the current output from the conductive row wires 104. Similarly, when voltage pulses are supplied from the conductive row wires 104 as input to the backward cycle, a vector-matrix product is computed on the transpose of the weight matrix W$^T$. Finally, in the update cycle voltage pulses representing vectors x and δ are simultaneously supplied from the conductive column wires 106 and the conductive row wires 104. Thus, each RPU device 108 performs a local multiplication and summation operation by processing the voltage pulses coming from the corresponding conductive column wire 106 and conductive row wire 104, thus achieving an incremental weight update.

As provided above, the resistance values of the RPU devices are limited in a bounded range with limited and finite state resolution which limits the weight range that can be used for ANN training. Further, the operations performed on an RPU array are analog in nature and thus prone to various sources of noise. When the input values to the RPU array are small (such as for the backward pass), the output signal y can be buried by the noise, thus producing an incorrect result (i.e., y=W.δ+noise, W.δ«noise). See, for example, U.S. Patent Application Publication Number 2018/0293209 by Gokmen et al., entitled "Noise and Bound Management for RPU Array" (hereinafter "U.S. Patent Application Publication Number 2018/0293209"), the contents of which are incorporated by reference as if fully set forth herein which (as described in detail below) provides techniques for reducing noise in an output signal from an RPU array, as well as managing the bound to eliminate saturation.

For noise and bound management in an RPU array, the input vector in analog space can be given as:

$$\hat{x} = f_{DAC}\left(\frac{1}{\alpha}x\right) \quad (1)$$

and the digital output vector can be given as:

$$y = \alpha f_{ADC}(\hat{y}), \quad (2)$$

wherein $f_{DAC}$ and $f_{ADC}$ denote the transformation by the digital-to-analog converter (DAC) and analog-to-digital converter (ADC) (see below), respectively, and $\alpha$ is a noise and bound management factor. The ADC is bounded in some range, $-b, \ldots, b$, wherein parameter b is the saturation threshold, and values below $-b$ or above b are saturated to the respective bound (see, for example, FIG. 9 of U.S. Patent Application Publication Number 2018/0293209, the contents of which are incorporated by reference as if fully set forth herein).

Using noise management approaches such as those described in U.S. Patent Application Publication Number 2018/0293209, the noise and bound management factor $\alpha$ can be set as:

$$\alpha = \max(|x_i|). \quad (3)$$

Additionally, if the analog computing output $\hat{y}$ is larger than the bound, i.e., $|\hat{y}| > b$, then the computation is repeated with setting $\alpha \leftarrow 2\alpha$ iteratively until the output is below the bound (bound management). For additional details on RPU arrays see, for example, U.S. Pat. No. 9,646,243 issued to Gokmen, entitled "Convolutional Neural Networks Using Resistive Processing Unit Array," the contents of which are incorporated by reference as if fully set forth herein.

However, resistive crossbar elements are limited in accuracy (determined by the minimal update step size $dw_{min}$) and bounded within a limited range, $w \in (w_{min}, W_{max})$. On the other hand, in deep learning networks the weight range initialization depends on the array size. This weight range initialization is done to ensure that the input to output variances (across input vectors, e.g., images) is approximately 1:1. See, for example, Krizhevsky et al., "ImageNet Classification with Deep Convolutional Neural Networks," Communications of the ACM, volume 60, Issue 6, June 2017 (9 pages), the contents of which are incorporated by reference as if fully set forth herein. In particular, one exemplary method (the Xavier initialization method) involves initializing the weight range as $w_{init} \in u(-l(n_{in}), l(n_{in}))$, wherein $(n_{in})$ is the number of columns of the weight matrix W and wherein:

$$l(n_{in}) \equiv \frac{\sqrt{3}}{\sqrt{n_{in}}}. \quad (4)$$

Thus, a large array needs a small weight range, and a small array needs a large weight range. This concept is leveraged in accordance with the present techniques, whereby the weight range of the RPU array is scaled by a (scaling) factor $\beta$ that depends on the weight matrix size, and the resistive values of the RPU devices are mapped into the range of the mathematical weight using the scaling factor $\beta$ (a process referred to herein as "auto weight scaling"). See, for example, methodology 200 of FIG. 2 for ANN training with auto weight scaling.

Figure 2:
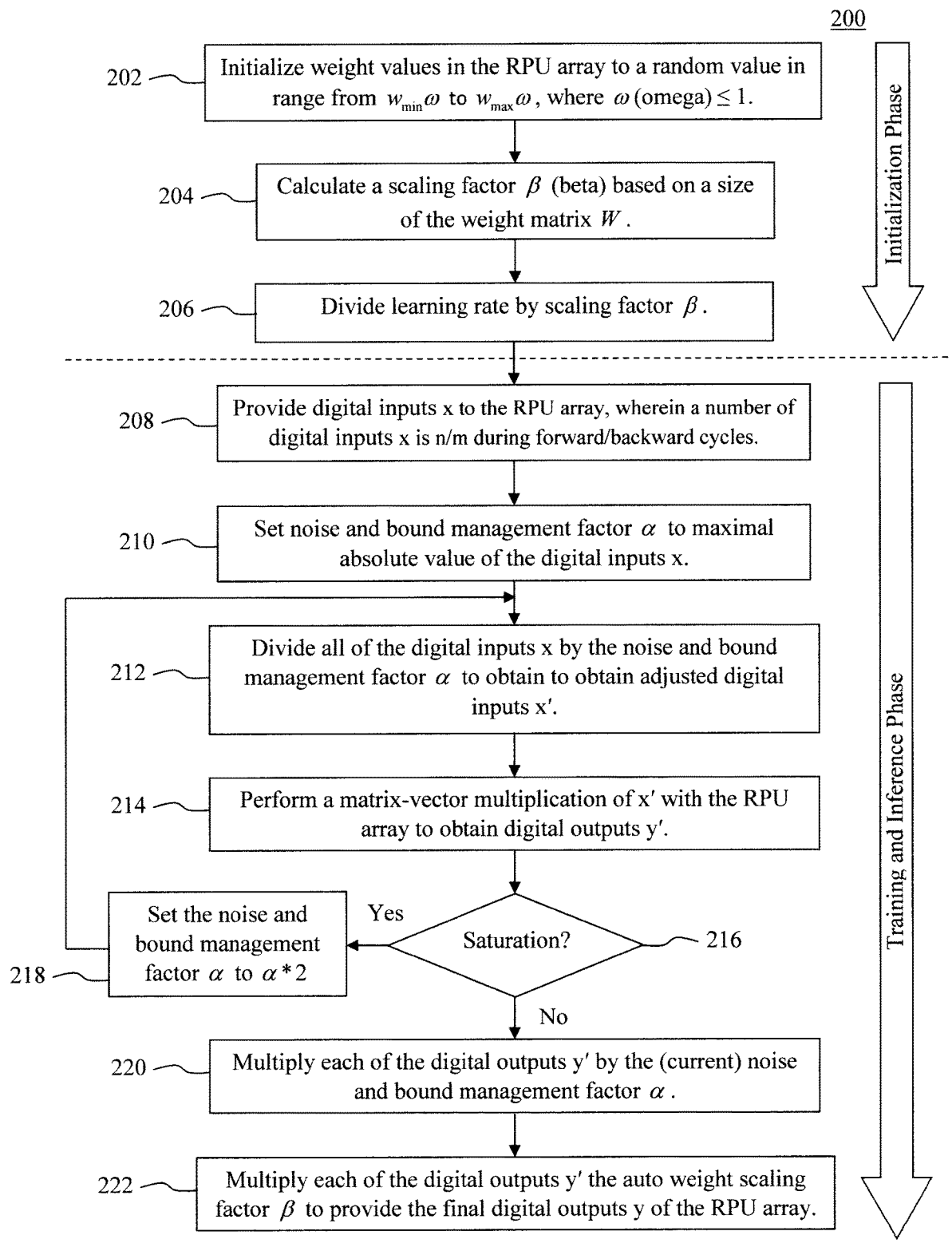
FIG. 2 is a diagram illustrating an exemplary methodology for ANN training according to an embodiment of the present invention.

As shown in FIG. 2, methodology 200 has an Initialization Phase followed by a Training and Inference Phase (forward/backward pass). An RPU array is used to represent a weight matrix W with m rows and n columns. See, for example, RPU array 300 in FIG. 3. As described in conjunction with the description of FIG. 1 above, the weight values w of weight matrix W are stored as the resistive values of the RPU devices (labeled "RPU") in array 300. It is assumed that the resistive values of the RPU devices in array 300 have a limited range, rmin to rmax, and that their valid resistive values are mapped to between minimal $w_{min}$ and maximal $w_{max}$ in terms of the weight values w.

In step 202, the weight values w are initialized ($w_{init}$) to a random number in the range from $w_{min}\omega$ to $w_{max}\omega$, wherein $\omega$ (omega) is a number that is less than or equal to 1, i.e., $$w_{init} \in u(w_{min}\omega, w_{max}\omega). \quad (5)$$

The value for $\omega$ can be set by the user (e.g., $\omega = 0.4$) and is independent of the size (i.e., based on number of column and/or rows) of the weight matrix W.

In step 204, a scaling factor $\beta$ (beta) is calculated based on the size, i.e., number of rows and/or columns of the weight matrix W. According to an exemplary embodiment, $\beta$ is inversely proportional to the square root of the number columns (and/or rows) of the weight matrix W. For instance, in one exemplary embodiment, $\beta$ is set to two times the square root of three divided by the difference of $w_{max}$ and $w_{min}$, divided by $\omega$ (omega), and divided by the square root of the number of columns n. See, e.g., Equation 7, below. Hereafter, this value for $\beta$ (set during initialization) is stored and fixed for the remainder of the process.

In step 206, $\beta$ is used to scale the learning rate for the weight update cycle during backpropagation. As is known in the art, the learning rate is a hyper-parameter that controls by how much the weight values w of weight matrix W are changed. For a general discussion of learning rate, see, e.g., U.S. Patent Application Publication Number 2017/0154259 by Burr et al., entitled "Neuron-Centric Local Learning Rate for Artificial Neural Networks to Increase Performance, Learning Rate Margin, and Recue Power Consumption," the contents of which are incorporated by reference as if fully set forth herein.

For instance, according to an exemplary embodiment, if $\lambda$ (lambda) is the learning rate set by the user, then the learning rate used during the update phase of the ANN training (see below) is divided by the scaling factor $\beta$, i.e., $$\lambda \leftarrow \lambda / \beta. \quad (6)$$

The Initialization Phase (performed in steps 202-206) now complete. It is notable that, according to an exemplary embodiment, one or more steps of the Initialization Phase and the Training and Inference Phase are performed outside of the of the RPU array hardware, for example, by an apparatus such as apparatus 500 described in conjunction with the description of FIG. 5, below.

As shown in FIG. 2, the next phase of methodology 200 is the Training and Inference Phase (forward/backward pass). As provided above, ANN training can involve a SGD process with backpropagation. Generally, backpropagation is performed in three cycles, a forward cycle, a backward cycle, and a weight update cycle which are repeated multiple times (multiple iterations) until a convergence criterion is met. For a general description of the cycles used during backpropagation, see for example, U.S. patent application Ser. No. 16/400,674 by Tayfun Gokmen, entitled "DNN Training with Asymmetric RPU Devices," the contents of which are incorporated by reference as if fully set forth herein.

In accordance with the present techniques, in each iteration, digital inputs x are provided to the RPU array. See step 208. The number of digital inputs x is n during the forward cycle pass and the number of digital inputs x is m during backward cycle pass (matching the size of the matrix W with m rows and n columns).

Figure 3:
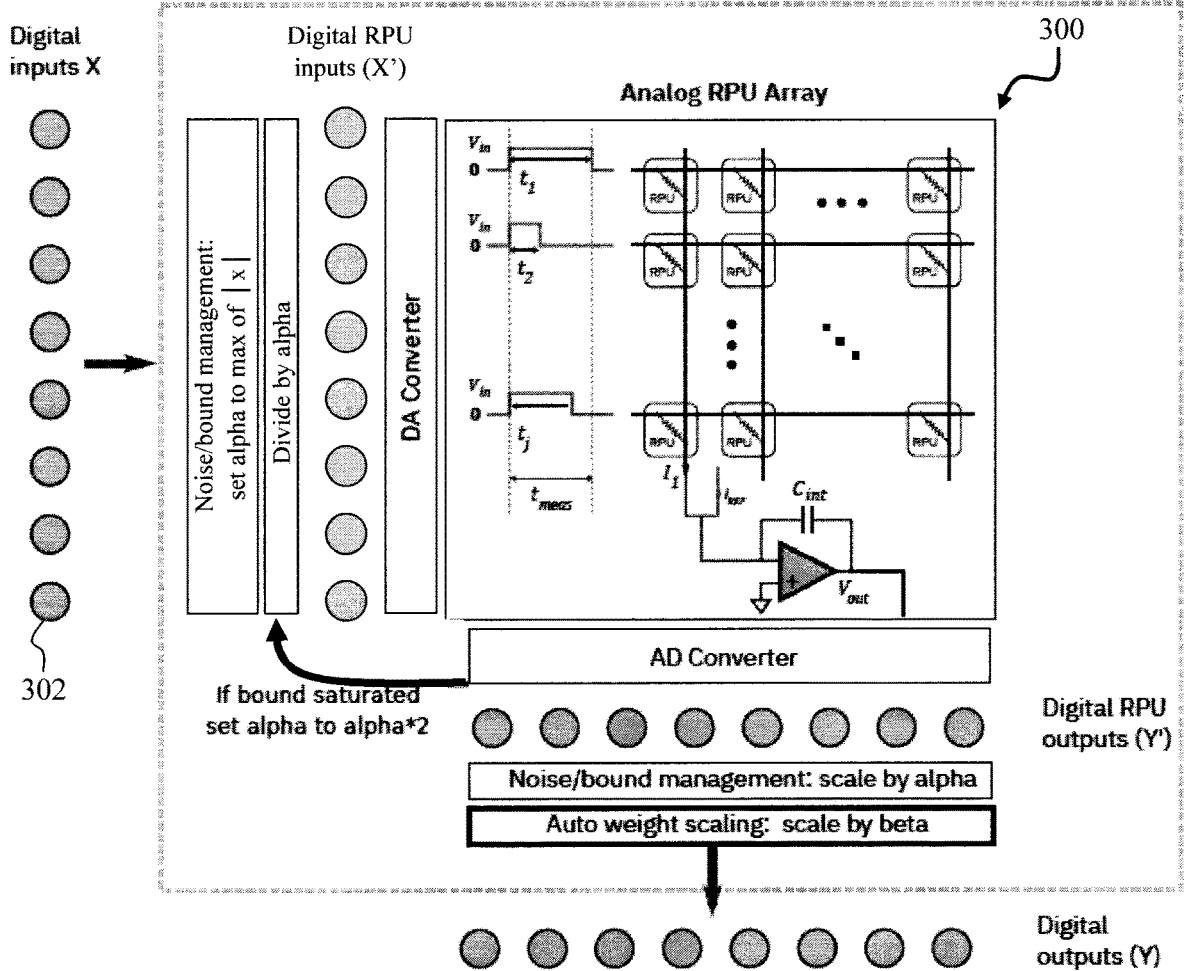
FIG. 3 is a diagram illustrating an exemplary RPU array in which the methodology of FIG. 2 can be implemented according to an embodiment of the present invention.

For instance, referring to FIG. 3, each circle 302 represents a separate digital input x to RPU array 300. For example, in a forward cycle pass the digital inputs x are provided to the m rows of matrix W. In a backward cycle pass, the digital inputs x are provided to the n columns of matrix W.

According to an exemplary embodiment, noise and bound management techniques such as those described in U.S. Patent Application Publication Number 2018/0293209, are implemented in accordance with methodology 200. For instance, in step 210 the noise and bound management factor α (alpha) is set to a maximal absolute value of the digital inputs x (as per Equation 3 above, i.e., wherein the maximal absolute value is the absolute value of the largest value among the digital inputs x), and in step 212 all of the digital inputs x are divided by a (the maximal absolute value of the digital inputs x) to obtain adjusted digital inputs x'.

See, for example, FIG. 3 where it is shown that the noise and bound management factor α is set to the max of |x|, and each of the digital inputs x is divided by α to obtain adjusted digital inputs x'. A digital-to-analog converter (labeled "DA converter") provides the digital inputs x' values as input to the RPU array 300 as analog pulse widths.

In step 214, the RPU array (e.g., RPU array 300—see FIG. 3) performs a matrix-vector multiplication (i.e., w*x' in the case of a forward cycle pass and with transposed w—exchange the meaning of columns and rows—in the case of a backward pass) with analog noise (i.e., the analog computation of matrix product is noisy). As will be described in detail below, the output from each forward and backward cycle pass through the RPU array is multiplied by factor β for auto weight scaling of the output based on the size of the array. For instance, according to an exemplary embodiment, based on the initialization method chosen (such as Xavier initialization—see Equation 4 above), during each forward and backward cycle pass the output y of the RPU array is set as $y = \beta \alpha f_{ADC}(\hat{y})$ wherein, $$\beta \equiv \frac{2l(n_{in})}{(w_{max} - w_{min})\omega} = \frac{2\sqrt{3}}{(w_{max} - w_{min})\omega \sqrt{n_{in}}}. \quad (7)$$

Thus, advantageously, the present techniques provide noise and bound management during training with the added benefit of auto weight scaling for increased accuracy with RPU arrays of any size, big or small.

As shown in FIG. 3, the (analog) outputs from the RPU array 300 are converted into a vector of digital RPU outputs y' by an analog-to-digital converter (labeled "AD Converter"). A determination is then made in step 216 as to whether a maximal absolute value of the digital outputs y', i.e., wherein the maximal absolute value is the absolute value of the largest value among the digital outputs y', is saturated by an output threshold. According to an exemplary embodiment, the output threshold (see parameter b above) is a fixed positive number specified by the dynamic range of the RPU hardware, e.g., b is the limited range of the ADC which can be set by the op amp range used for the ADC. The concept of saturation is described in U.S. Patent Application Publication Number 2018/0293209.

If it is determined in step 216 that Yes the maximal absolute value of the digital outputs y' is saturated by the output threshold, then in step 218 the noise and bound management factor α (alpha) is set to two times alpha (see, for example, FIG. 3 "alpha*2") and, as shown in FIG. 2, steps 212-218 are repeated until there is no saturation detected.

On the other hand, if it is determined in step 216 that No the maximal absolute value of the digital outputs y' is not saturated by the output threshold then, in step 220, each of the digital outputs y' is multiplied by the noise and bound management factor α (see, for example, FIG. 3 "Noise/bound management: scale by alpha"). It is notable that the current value of the noise and bound management factor α reflects the adjustments, if any, made in step 218 during the one or more iterations of steps 212-218—see above.

In step 222, each of the digital outputs y' is multiplied by the auto weight scaling factor β to provide the final digital outputs y of the RPU array 300 (see, for example, FIG. 3 "Auto weight scaling: scale by beta"). Thus, as provided above, the present techniques advantageously provide noise and bound management during training with the added benefit of auto weight scaling for increased accuracy with RPU arrays of any size.

Figure 4A:
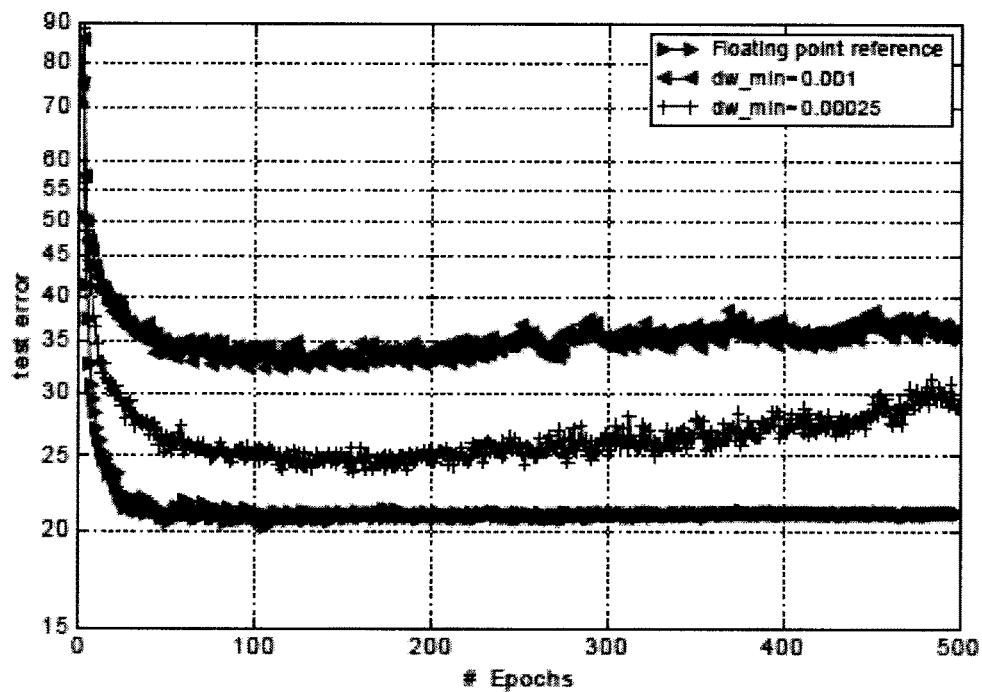
FIG. 4A is a diagram illustrating the results of simulations of ANN training performed without auto weight scaling.
Figure 4B:
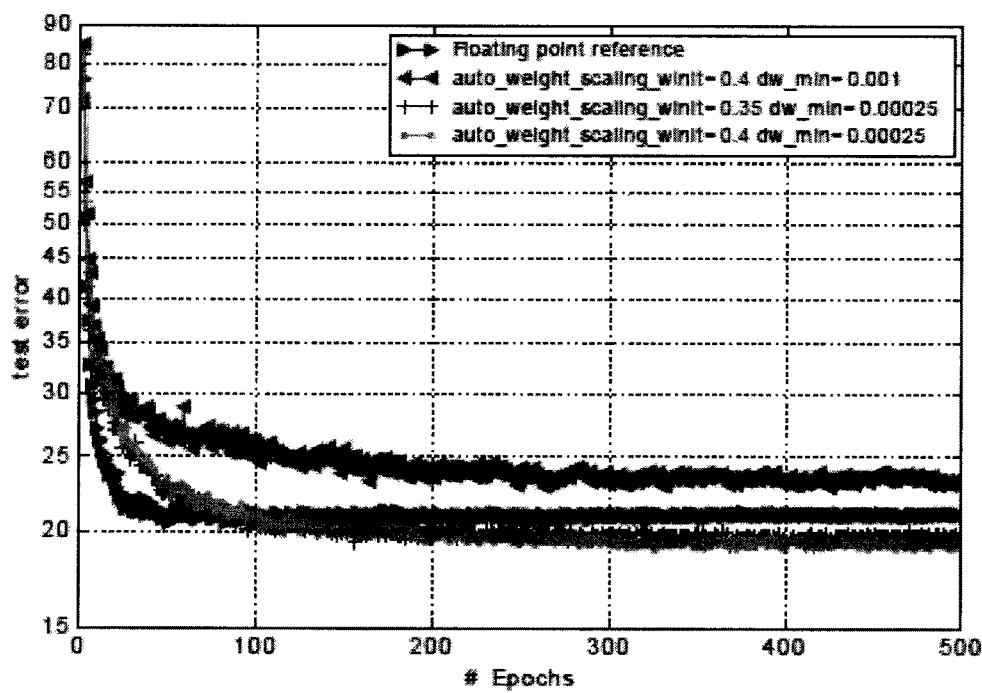
FIG. 4B is a diagram illustrating the results of simulations of ANN training performed with auto weight scaling according to an embodiment of the present invention.

The results of simulations of ANN training performed without and with the present auto weight scaling are shown in FIG. 4A and FIG. 4B, respectively. In this example, a three-layer convolutional ANN with one fully connected layer was employed with Xavier weight initialization (see above) and weight bounds 0.6 and a batch size of 10. Two different ω ("auto weight scaling $w_{int}$") and different settings for the minimal pulsed size $dw_{min}$ are shown. The material is taken to be symmetric. A 9 bit analog-to-digital converter and a 7 bit digital-to-analog converter were employed. Noise was 0.06, b=12, and $w_{min/max}$=0.6.

Auto weight scaling improves the pulsed training performance dramatically. Compare the curves in FIG. 4A with the corresponding curves in FIG. 4B.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
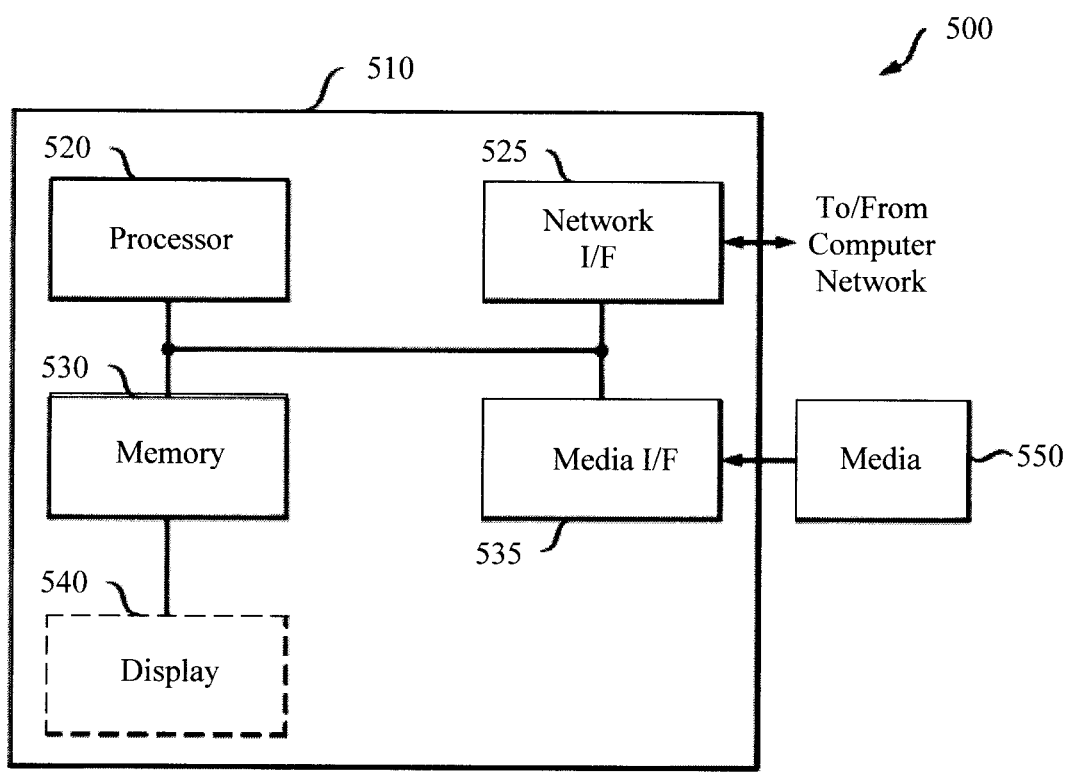
FIG. 5 is a diagram illustrating an exemplary apparatus that can be employed in carrying out one or more of the present techniques according to an embodiment of the present invention.

Turning now to FIG. 5, a block diagram is shown of an apparatus 500 for implementing one or more of the methodologies presented herein. By way of example only, apparatus 500 can be configured to perform one or more steps of methodology 200 of FIG. 2.

Apparatus 500 includes a computer system 510 and removable media 550. Computer system 510 includes a processor device 520, a network interface 525, a memory 530, a media interface 535 and an optional display 540. Network interface 525 allows computer system 510 to connect to a network, while media interface 535 allows computer system 510 to interact with media, such as a hard drive or removable media 550.

Processor device 520 can be configured to implement the methods, steps, and functions disclosed herein. The memory 530 could be distributed or local and the processor device 520 could be distributed or singular. The memory 530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 520. With this definition, information on a network, accessible through network interface 525, is still within memory 530 because the processor device 520 can retrieve the information from the network. It should be noted that each distributed processor that makes up processor device 520 generally contains its own addressable memory space. It should also be noted that some or all of computer system 510 can be incorporated into an application-specific or general-use integrated circuit.

Optional display 540 is any type of display suitable for interacting with a human user of apparatus 500. Generally, display 540 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for artificial neural network (ANN) training, the method comprising the steps of:
   initializing weight values $w_{init}$ in an array of resistive processing unit (RPU) devices to a random value, wherein the array of RPU devices represents a weight matrix W with m rows and n columns by storing weight values w of the weight matrix W as resistive values of the RPU devices in the array;
   calculating a scaling factor β based on a size of the weight matrix W;
   providing digital inputs x to the array;
   dividing the digital inputs x by a noise and bound management factor α to obtain adjusted digital inputs x';
   performing a matrix-vector multiplication of the adjusted digital inputs x' with the array to obtain digital outputs y';
   multiplying the digital outputs y' by the noise and bound management factor α; and
   multiplying the digital outputs y' by the scaling factor β to provide digital outputs y of the array.

2. The method of claim 1, further comprising the step of: setting the noise and bound management factor α to a maximal absolute value of the digital inputs x.

3. The method of claim 1, wherein a maximal absolute value of the digital outputs y' is saturated by an output threshold, the method further comprising the steps of:
   setting the noise and bound management factor α to α*2; and
   repeating the dividing, performing and setting steps until there is no saturation.

4. The method of claim 1, wherein the random value is from $w_{min}\omega$ to $w_{max}\omega$, and wherein ω is a number that is less than or equal to 1.

5. The method of claim 4, wherein a value for ω is set by a user.

6. The method of claim 4, wherein the scaling factor β is calculated as:

$$\beta \equiv \frac{2\sqrt{3}}{(w_{max} - w_{min})\omega\sqrt{n_{in}}},$$

wherein $n_{in}$ is a number of the n columns in the weight matrix W.

7. The method of claim 1, wherein scaling factor β is inversely proportional to a square root of a number of the n columns or a number of the m rows in the weight matrix W.

8. The method of claim 1, further comprising the step of: scaling a learning rate λ using the scaling factor β.

9. The method of claim 8, wherein the learning rate λ is scaled by dividing the learning rate λ by the scaling factor β.

10. The method of claim 1, wherein a number of the digital inputs x to the array is n during a forward cycle and m during a backward cycle.

11. A method for ANN training, the method comprising the steps of:
    initializing weight values $w_{init}$ in an array of RPU devices to a random value, wherein the array of RPU devices represents a weight matrix W with m rows and n columns by storing weight values w of the weight matrix W as resistive values of the RPU devices in the array;
    calculating a scaling factor β based on a size of the weight matrix W, wherein the scaling factor β is inversely proportional to a square root of a number of the n columns or a number of the m rows in the weight matrix W;
    providing digital inputs x to the array, wherein a number of the digital inputs x to the array is n during a forward cycle and m during a backward cycle;
    dividing the digital inputs x by a noise and bound management factor α to obtain adjusted digital inputs x', wherein the noise and bound management factor α is set to a maximal absolute value of the digital inputs x;
    performing a matrix-vector multiplication of the adjusted digital inputs x' with the array to obtain digital outputs y';
    multiplying the digital outputs y' by the noise and bound management factor α; and
    multiplying the digital outputs y' by the scaling factor β to provide digital outputs y of the array.

12. The method of claim 11, wherein a maximal absolute value of the digital outputs y' is saturated by an output threshold, the method further comprising the steps of:
    setting the noise and bound management factor α to α*2; and
    repeating the dividing, performing and setting steps until there is no saturation.

13. The method of claim 11, wherein the random value is from $w_{min}\omega$ to $w_{max}\omega$, and wherein ω is a number that is less than or equal to 1.

14. The method of claim 13, wherein a value for ω is set by a user.

15. The method of claim 13, wherein the scaling factor β is calculated as:

$$\beta \equiv \frac{2\sqrt{3}}{(w_{max} - w_{min})\omega\sqrt{n_{in}}},$$

wherein $n_{in}$ is a number of the n columns in the weight matrix W.

16. The method of claim 11, further comprising the step of:
    scaling a learning rate λ using the scaling factor β.

17. The method of claim 16, wherein the learning rate λ is scaled by dividing the learning rate λ by the scaling factor β.

18. A method for ANN training, the method comprising the steps of:
    initializing weight values $w_{init}$ in an array of RPU devices to a random value from $w_{min}\omega$ to $w_{max}\omega$, wherein ω is a number that is less than or equal to 1, and wherein the array of RPU devices represents a weight matrix W with m rows and n columns by storing weight values w of the weight matrix W as resistive values of the RPU devices in the array;
    calculating a scaling factor β based on a size of the weight matrix W, wherein the scaling factor β is inversely proportional to a square root of a number of the n columns or a number of the m rows in the weight matrix W;

scaling a learning rate λ using the scaling factor β;

providing digital inputs x to the array, wherein a number of the digital inputs x to the array is n during a forward cycle and m during a backward cycle;

dividing the digital inputs x by a noise and bound management factor α to obtain adjusted digital inputs x', wherein the noise and bound management factor α is set to a maximal absolute value of the digital inputs x;

performing a matrix-vector multiplication of the adjusted digital inputs x' with the array to obtain digital outputs y';

multiplying the digital outputs y' by the noise and bound management factor α; and multiplying the digital outputs y' by the scaling factor β to provide digital outputs y of the array.

19. The method of claim 18, wherein a maximal absolute value of the digital outputs y' is saturated by an output threshold, the method further comprising the steps of:

setting the noise and bound management factor α to α*2; and repeating the dividing, performing and setting steps until there is no saturation.

20. The method of claim 18, wherein a value for ω is set by a user.

21. The method of claim 18, wherein the scaling factor β is calculated as:

$$\beta \equiv \frac{2\sqrt{3}}{(w_{max} - w_{min})\omega\sqrt{n_{in}}},$$

wherein $n_{in}$ is a number of the n columns in the weight matrix W.

22. The method of claim 18, wherein the learning rate λ is scaled by dividing the learning rate λ by the scaling factor β.

23. A computer program product for ANN training, the computer program product comprising a computer readable storage medium having program instructions embodied therewith, the program instructions executable by a computer to cause the computer to perform the steps of:

initializing weight values $w_{init}$ in an array of RPU devices to a random value, wherein the array of RPU devices represents a weight matrix W with m rows and n columns by storing weight values w of the weight matrix W as resistive values of the RPU devices in the array;

calculating a scaling factor β based on a size of the weight matrix W;

providing digital inputs x to the array;

dividing the digital inputs x by a noise and bound management factor α to obtain adjusted digital inputs x' with which matrix-vector multiplication is performed with the array to obtain digital outputs y';

multiplying the digital outputs y' by the noise and bound management factor α; and multiplying the digital outputs y' by the scaling factor β to provide digital outputs y of the array.

* * * * *